United States Patent
Bin et al.

(10) Patent No.: US 7,690,796 B2
(45) Date of Patent: Apr. 6, 2010

(54) COLOR PROJECTION DISPLAY SYSTEM

(75) Inventors: Fan Bin, Shanghai (CN); Jianxin Shao, Shanghai (CN)

(73) Assignee: Kinoptics Technologies Inc., Hong Kong (CN)

( * ) Notice: Subject to any disclaimer, the term of this patent is extended or adjusted under 35 U.S.C. 154(b) by 0 days.

(21) Appl. No.: 10/506,304

(22) PCT Filed: Feb. 10, 2004

(86) PCT No.: PCT/CN2004/000110

§ 371 (c)(1),
(2), (4) Date: Sep. 1, 2004

(87) PCT Pub. No.: WO2005/008617

PCT Pub. Date: Jan. 27, 2005

(65) Prior Publication Data

US 2005/0174543 A1 Aug. 11, 2005

(30) Foreign Application Priority Data

| Jul. 18, 2003 | (CN) | ................................ 03 1 41689 |
| Aug. 14, 2003 | (CN) | ............................. 03 2 09723 U |

(51) Int. Cl.
*G03B 21/14* (2006.01)
(52) U.S. Cl. ............................. 353/31; 353/33; 353/34; 353/84; 349/5
(58) Field of Classification Search ............ 353/20, 353/7, 8, 31, 34, 37, 81; 349/5, 7, 8, 9, 15; 359/464, 465
See application file for complete search history.

(56) References Cited

U.S. PATENT DOCUMENTS

| 4,006,968 A | 2/1977 | Ernstoff et al. |
| 4,458,175 A | 7/1984 | Weekley |
| 4,811,003 A | 3/1989 | Strathman et al. |
| 5,029,986 A | 7/1991 | Da Vaan ..................... 349/113 |
| 5,105,289 A | 4/1992 | Sonehara et al. ............ 349/180 |
| 5,144,288 A | 9/1992 | Hamada et al. |
| 5,311,337 A | 5/1994 | McCartney, Jr. |
| 5,552,840 A * | 9/1996 | Ishii et al. ................... 348/751 |

(Continued)

FOREIGN PATENT DOCUMENTS

CN 01113471-2 10/1996

(Continued)

OTHER PUBLICATIONS

David R. Goff, Appendix B—Glossary of Terms *Fiber Optic Reference Guide*, Second Edition:p. 184 (1999).

(Continued)

*Primary Examiner*—William C Dowling
(74) *Attorney, Agent, or Firm*—Fish & Richardson P.C.

(57) ABSTRACT

The present invention is a 3D/2D convertible color projection display system with two color LCoS panels, which enable the system to project two orthogonal polarized images. When the two images correspond to different view angles, each eye of an observer wearing a pair of polaroid glasses can only see one of the images, creating a 3D stereoscopic effect. When the two images correspond to the same view angle, then the observer, without any special glasses, can watch regular 2D images with multiple primary colors.

40 Claims, 2 Drawing Sheets

U.S. PATENT DOCUMENTS

| | | | |
|---|---|---|---|
| 5,612,814 A * | 3/1997 | Yang | 359/291 |
| 5,825,443 A | 10/1998 | Kawasaki et al. | 349/95 |
| 5,921,650 A | 7/1999 | Doany et al. | |
| 5,933,183 A * | 8/1999 | Enomoto et al. | 347/241 |
| 5,963,289 A | 10/1999 | Stefanov et al. | |
| 6,097,456 A * | 8/2000 | Wang | 349/105 |
| 6,166,792 A | 12/2000 | Miyawaki et al. | 349/113 |
| 6,172,723 B1 | 1/2001 | Inoue et al. | 349/95 |
| 6,280,034 B1 * | 8/2001 | Brennesholtz | 353/20 |
| 6,351,280 B1 | 2/2002 | Benton | |
| 6,490,087 B1 * | 12/2002 | Fulkerson et al. | 359/487 |
| 6,515,724 B1 | 2/2003 | Drost et al. | |
| 6,547,396 B1 | 4/2003 | Svardal et al. | |
| 6,636,276 B1 * | 10/2003 | Rosenbluth | 349/8 |
| 6,681,005 B2 | 1/2004 | Liao et al. | 379/187 |
| 6,738,115 B1 | 5/2004 | Lijiima | 349/113 |
| 6,857,747 B2 * | 2/2005 | Pentico et al. | 353/31 |
| 7,255,448 B2 * | 8/2007 | Greer et al. | 353/84 |
| 2002/0036818 A1 | 3/2002 | Kawata | |
| 2004/0141154 A1 * | 7/2004 | Chen et al. | 353/31 |
| 2005/0253792 A1 | 11/2005 | Shao et al. | |

FOREIGN PATENT DOCUMENTS

| | | |
|---|---|---|
| CN | 2510883 | 12/2001 |
| CN | 1 392 534 | 1/2003 |
| CN | 13 92534 | 1/2003 |
| CN | 1402043 | 3/2003 |
| EP | 0 560 636 | 9/1993 |
| EP | 0 560 636 | 5/1998 |
| JP | 61-282823 | 12/1986 |
| WO | WO 00/63738 | 10/2000 |
| WO | WO 03/007074 | 1/2003 |
| WO | WO 03/096107 A1 | 11/2003 |

OTHER PUBLICATIONS

Abstract of WO 01/33290, published on May 10, 2001.
Supplementary European Search Report, dated Apr. 17, 2009.
Office Action from the European Patent Office dated Aug. 24, 2009, European Application No. 04709567.4.

* cited by examiner

COLOR PROJECTION DISPLAY SYSTEM

BACKGROUND OF THE INVENTION

This invention pertains to color projection display systems, specifically a 3D/2D convertible color projection display system.

Because of the development of high definition television (HDTV), many new display techniques have emerged, such as plasma display plate (PDP), thin film transistor (TFT), digital micromirror device (DMD), and liquid crystal on silicon (LCoS) technique. Chinese Patents No.01113471.2 and No. 02217356.0 provided a new color display solution, which combines the LCoS and micro optical interference filers together to form a new color LCoS device. This is a very promising micro-display device, because of its high resolution, high optical efficiency, high image quality, and low cost.

However, all of the above-mentioned techniques are for plane display without any stereoscopic effect. Stereoscopic vision is still a dream for display technology. Many efforts have been made for this. For example, U.S. Pat. No. 6,351,280 gave a solution where many micro polariod stripes were put on a LCD display panel. When an observer wears a pair of polariod glasses to watch the said panel, each of his/her eyes will see the different image, thus getting a stereoscopic effect. Until now, however, these methods have been too complicated, or not comfortable, and therefore not very practical.

SUMMARY OF THE INVENTION

An objective of the present invention is to provide a color stereoscopic (3D) projection display system with the advantage of simple structure, high optical efficiency, and low cost.

A further objective of the present invention is to provide a projection display system with six primary colors, which creates richer, more vivid, and more lifelike color images with higher optical efficiency.

A further objective of the present invention is to provide a color projection display system that is convertible between the 3D stereoscopic display and the 2D six primary color display.

The present invention's color projection display system consists of two color LCoS panels, a group of polarizing beam splitters, and a projection lens. The said color LCoS panel is a conventional LCoS panel combined with a micro dichroic filter array. The said group of polarizing beam splitters divides the incident illuminated light into linear polarized light 1 and linear polarized light 2, with the polarization direction of linear polarized light 2 being orthogonal to that of linear polarized light 1. The said linear polarized light 1 and linear polarized light 2 come out at different exit places of the said group of polarizing beam splitters. Each of the said color LCoS panels is located at one of the said exit places of the said group of polarizing beam splitters, and modulates the said linear polarized light 1 or 2 according to the inputting image signal. The polarization directions of the said modulated linear polarized light beams 3 and 4 are rotated 90 degree from those of the said linear polarized light beams 1 and 2, respectively. The said modulated linear polarized light beams 3 and 4 are reflected back to the said group of polarizing beam splitters, and are combined to be one image beam. The said image beam incidents on the projection lens and is projected out for display.

When the inputting image signals to the two said color LCoS panels correspond to different view angles, the present invention's color projection display system can display 3D stereoscopic images. And when the inputting image signals to the two said color LCoS panels are identical, the said display system will display 2D color images, or specifically 2D six primary color images if the primary colors of the said two color LCoS panels are different.

The said group of polarizing beam splitters can be constructed in several different ways. It may consist of just one conventional polarizing beam splitter. Or it may form a cuboid comprising four right-angle prisms with polarizing beam splitter coatings on their right-angle surfaces, which are arranged in a cross shape. Or it may be a cuboid comprising four conventional polarizing beam splitter cubes, with the four hypotenuses (polarizing beam splitter coating surfaces) of the said four polarizing beam splitter cubes constituting a cross or other shape.

The image quality can be improved by inserting half wave or quarter wave plates at the appropriate place.

DETAILED DESCRIPTION

Figure 1:
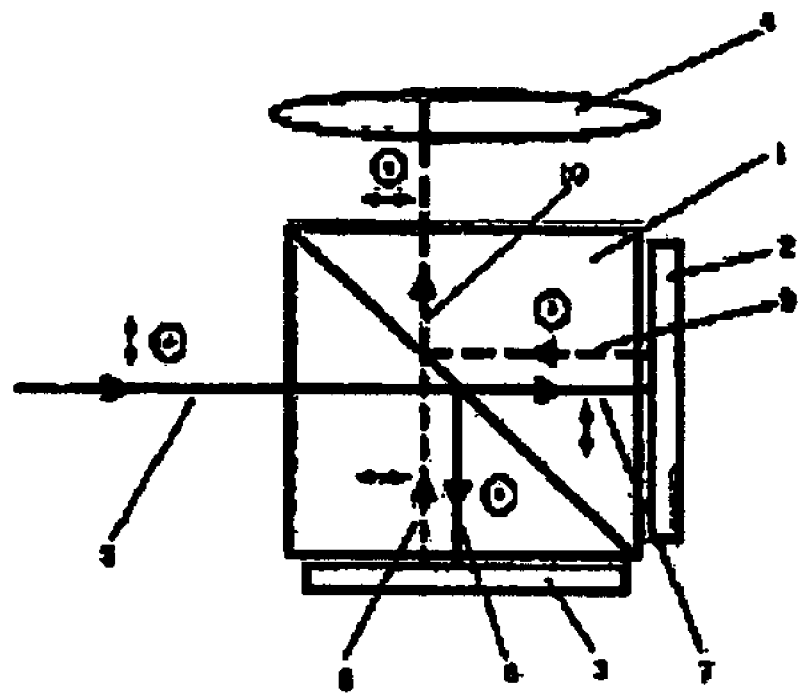
FIG. 1 is the principle sketch of the present invention's color projection display system.

FIG. 1 is the principle sketch of the present invention's color projection display system. It includes a polarizing beam splitter (1), two color LCoS panels (2, 3), and a projection lens (4). The said color LCoS panels can be conventional LCoS panels combined with micro dichroic filter array as described in Chinese Patents No. 01113471.2 and No. 02217356.0. The said color LCoS panels (2,3) are located at the two adjacent surfaces of the said polarizing beam splitter (1), and can be embedded individually with image signals corresponding to different view angles. The incident white natural light beam (5) is divided by the said polarizing beam splitter (1) into two orthogonal linear polarized light beams, s-polarized beam (6) and p-polarized beam (7), which then come to the said color LCoS panels (3) and (2) separately. The said polarized beams (6) and (7) are reflected and modulated by the said color LCoS panels (2) and (3). The modulated p-polarized beam (8) and s-polarized beam (9) go through the said polarizing beam splitter (1) again and are combined into one image beam (10). The said image beam (10) is amplified and projected out by the projection lens (4) for display. Thus, part of the light in the projection display image is the p-polarized light from color LCoS panel (3), and the other part is s-polarized light from color LCoS panel (2).

When an observer wears a pair of polaroid glasses with orthogonal polarization direction for each eye, each eye can only see either the s-polarized image or the p-polarized image. Since the image signals inputted into the color LCoS panels (2) and (3) correspond to different view angle, each eye will see the image from a different view angle, thus creating a stereoscopic (3D) effect.

When the inputting image signals to the said color LCoS panels (2) and (3) are the same, the projected images from the said two color LCoS panels can be aligned to superposition by adjusting the relative position of the said two color LCoS panels. This alignment can be fixed during the initial assembly. Thus, the observer can see the 2D display image without any special glasses. Because there is no need for a polarization convert device for this projection system, both directions of polarized light can be used, and the optical efficiency is increased. And the color grade will be increased by using two color LCoS panels, especially when that two color LCoS panels are with different primary colors. For example, when one of the said color LCoS panels has red, green, and blue as the primary colors and the other color LCoS panel has cyan, magenta, and yellow as the primary colors, the comprised color projection system will be a six primary color display system with richer, more vivid, and more lifelike display color.

The present invention's color projection display system is simple, low-cost, and high in optical efficiency. It can be used for both color 3D stereoscopic display and conventional 2D color display, or 2D six primary color display for richer, more vivid, and more lifelike color image. Another advantage of this system is that it can be switched easily between 3D stereoscopic display and 2D color display by controlling the inputting image signals to the two color LCoS panels.

Part of the illuminating light on color LCoS panel (2) and (3) is modulated and changed in polarization direction for projection display. The other part of the illuminating light is reflected back by the color LCoS panels without changing its polarization direction. This part of light can be reused to increase the optical efficiency and luminance through a recycle system. (See also Chinese Patent No. 02217355.2.)

For an available polarizing beam splitter, the extinction ratio of transmission (about 1000) is much greater than that of reflection (about 20). However, for the application as shown in FIG. 1, both transmission and reflection are used, which will cause reduction of the overall projection image.

Figure 2:
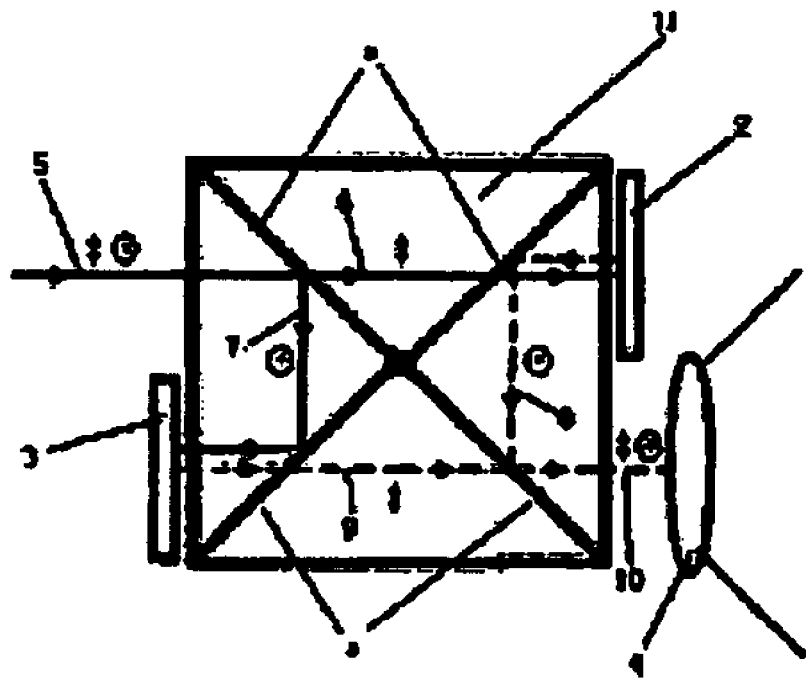
FIG. 2 is the sketch of a real example of the present invention.

FIG. 2 is an improved example of the present invention's color projection system. The said group of polarizing beam splitters (11) is a cuboid comprising four right angle prisms with polarizing beam splitter coatings(a) on theirs right-angle surfaces, while the said four polarizing beam splitter coated surfaces constitute a cross (as shown in FIG. 2). Two color LCoS panels (2) and (3) are located separately at the output ends of the light path of p-polarized beam (6) and s-polarized beam (7), and are parallel to the hypotenuse surface of the said right angle prisms (as shown in FIG. 2). Since the illuminating light beams (6) and (7) and the image light beams (8) and (9) all pass through the said polarizing beam splitter coatings (a) twice (twice transmission, or twice reflection), the extinction ratio will be increased greatly, which will obviously increase the contrast of the projection image and improve the image quality.

Figure 3:
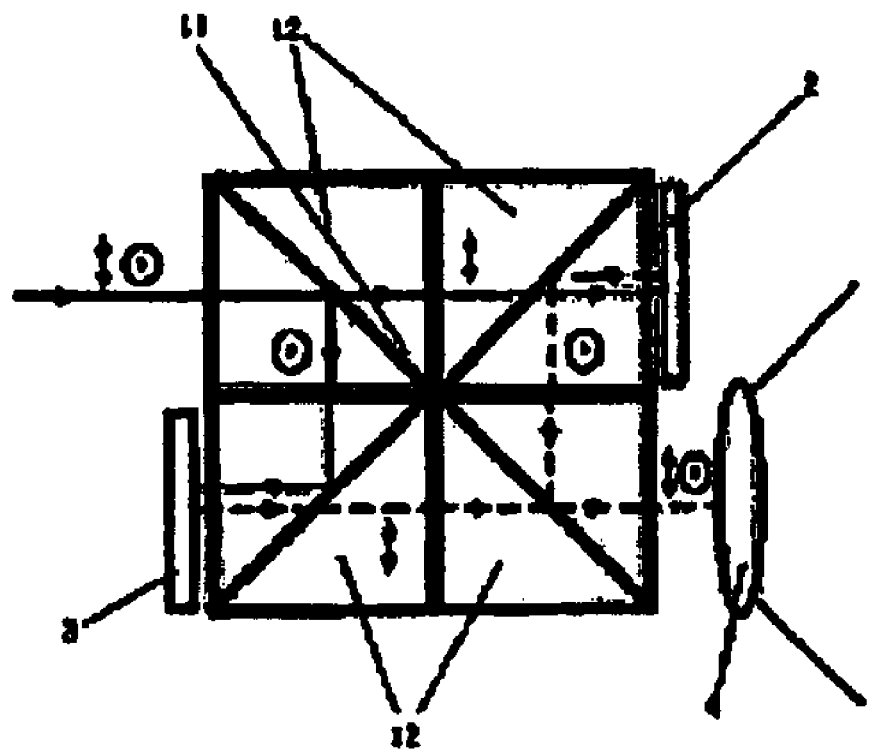
FIG. 3 is the sketch of another example of the present invention.

FIG. 3 is another improved example of the present invention's color projection system. In this example, the said group of polarizing beam splitters (11) is a cuboid comprising four commercial polarizing beam splitter cubes (12), while the four hypotenuses (polarizing beam splitter coating surface) of the said four polarizing beam splitter cubes constitute a cross (as shown in FIG. 3). The working principle of this example is exactly the same as that of the example shown in FIG. 2. The advantage of this example is that it can use commercial polarizing beam splitter cubes, which will be helpful for mass production and cost reduction.

Figure 4:
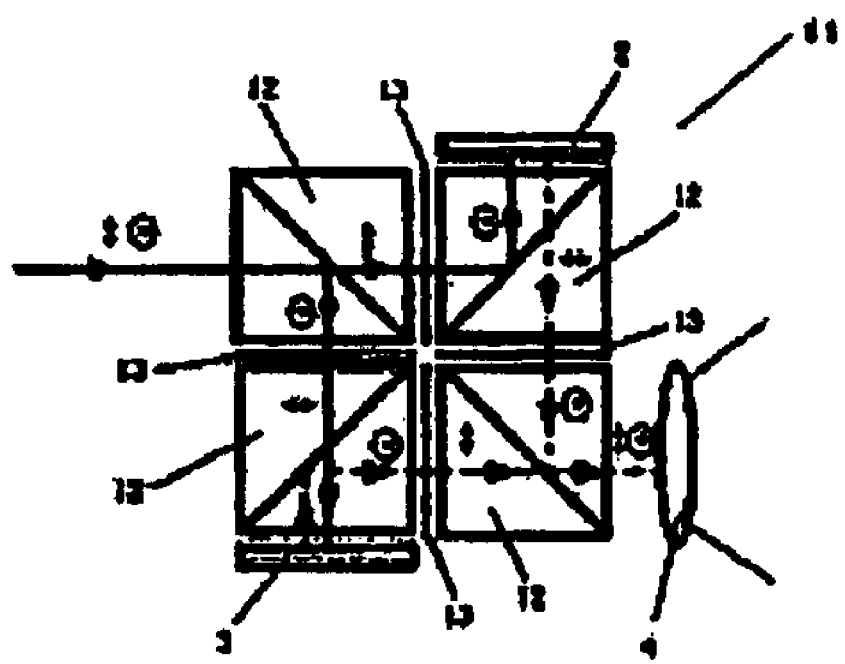
FIG. 4 is the sketch of another example of the present invention with half wave plates.

FIG. 4 is a further improved example of FIG. 3's projection system. Again, the said group of polarizing beam splitters (11) is a cuboid comprising four commercial polarizing beam splitter cubes (12). The only difference from FIG. 3' system is that there is a halfwave plate (13) inserted between every two polarizing beam splitter cubes (12), as shown in FIG. 4. A halfwave plate can rotate the polarization direction of a polarized light beam by 90 degrees; i.e., it can change an s-polarized light into a p-polarized light, or vice versa. Thus each illuminated light beam or each image light beam will pass through the polarizing beam splitter coatings twice (once transmission, once reflection), which will be very helpful for the balance of the two image light beams. The extinction ratio of both image beams will be very close, resulting in the maximum extinction ratio of the overall image beam. The image contrast will be increased, and the image quality will be improved.

Inserting a quarterwave plate in front of a color LCoS panel will also be helpful for improving the image contrast. (See also U.S. Pat. No. 5,327,270).

The present invention's color projection system is capable of easily achieving stereoscopic display and multiple primary color display, and easily switching from one mode to the other.

It is to be understood that the invention is not limited to features and embodiments hereinabove specifically set forth, but may be carried out in other ways without departure from its spirit.

We claim:

1. A system comprising:

first and second liquid crystal on silicon (LCoS) display panels each comprising a micro dichroic filter array, each micro dichroic filter array including multiple elements configured to transmit a portion of an incident light beam, the transmitted portion being a filtered portion where the filtered portion from different elements are different colors, and each element being further configured to reflect a portion of the incident light beam, the reflected portion being an unfiltered portion of the light beam, so that the polarization of the unfiltered portion is not changed when leaving the display panel, wherein each display panel is configured to reflect and modulate filtered portions from the corresponding micro dichroic filter array within the display panel so that the polarization of at least some of the filtered portions is changed when leaving the display panel; and a polarizing beam splitter assembly configured so that during operation the polarizing beam splitter assembly combines the filtered portions of a first light beam reflected by the first display panel with filtered portions of a second light beam reflected by the second display panel to form an image beam, and the combined filtered portions of the first and second light beams have mutually orthogonal polarization states.

2. The system of claim 1, wherein the elements of the micro dichroic filter arrays are configured to transmit primary colors.

3. The system of claim 1, wherein elements of the micro dichroic filter array of the first display panel are configured to transmit either red, green, or blue light.

4. The system of claim 3, wherein elements of the micro dichroic filter array of the second display panel are configured to transmit either red, green, and blue light.

5. The system of claim 3, wherein elements of the micro dichroic filter array of the second display panel are configured to transmit either cyan, magenta, and yellow light.

6. The system of claim 1, wherein the first and second color display panels are located at adjacent surfaces of the polarizing beam splitter assembly.

7. The system of claim 1, wherein the first and second color display panels are located at opposite surfaces of the polarizing beam splitter assembly.

8. The system of claim 1, wherein the polarizing beam splitter assembly is configured to split an illumination beam into a first input light beam and a second input light beam and direct the first input light beam towards the first display panel and the second input light beam towards the second display panel.

9. The system of claim 8, wherein polarizing beam splitter assembly is configured so that the first and second input light beams have mutually orthogonal polarization states.

10. The system of claim 9, wherein system is configured so that the first input light beam and the portion of the first light beam reflected from the first display panel have mutually orthogonal polarization states.

11. The system of claim 10, wherein the system is configured so that the second input light beam and the portion of the second light beam reflected from the second display panel have mutually orthogonal polarization states.

12. The system of claim 1, wherein the polarizing beam splitter assembly comprises a single polarizing beam splitter.

13. The system of claim 1, wherein the polarizing beam splitter assembly comprises a plurality of polarizing beam splitters.

14. The system of claim 1, wherein the polarizing beam splitter assembly comprises a plurality of prisms arranged as a square.

15. The system of claim 14, wherein the prisms are right angle prisms.

16. The system of claim 15, wherein the right angle prisms have polarizing beam splitter coatings on their right angle surfaces.

17. The system of claim 1, wherein the polarizing beam splitter assembly comprises four polarizing beam splitter coatings arranged as a cross.

18. The system of claim 1, wherein the polarizing beam splitter assembly comprises four polarizing beam splitter cubes.

19. The system of claim 18, wherein the four polarizing beam splitter cubes are arranged as a square.

20. The system of claim 19, further comprising half wave plates positioned between the polarizing beam splitter cubes.

21. The system of claim 1, further comprising a projection lens configured to amplify the image beam.

22. The system of claim 1 further comprising first and second quarter wave plates respectively located between the first and second display panels and the polarizing beam splitter assembly.

23. The system of claim 1, wherein during operation the first and second display panels modulate the filtered portions of the first and second light beams reflected from the display panels so that the first and second light beam portions correspond to different view angles of an image.

24. The system of claim 1, wherein during operation the first and second display panels modulate the filtered portions of the first and second light beams reflected from the display panels so that the first and second light beam portions correspond to the same view angle of an image.

25. The system of claim 1, further comprising a light recycle system for resubmitting the unfiltered portions of the first and second light beams to the first and second display panels.

26. A system, comprising:
a polarizing beam splitter assembly including a plurality of polarizing beam splitter coatings arranged in orthogonal planes; and
first and second display panels positioned relative to the polarizing beam splitter assembly so that during operation the polarizing beam splitter assembly combines filtered light reflected from the first and second display panels to form an image beam,
wherein the first and second display panels each comprise a micro dichroic filter array, each micro dichroic filter array comprising multiple elements each configured to transmit a corresponding portion of an incident light beam, the transmitted portion being a filtered portion where the filtered portion from different elements are different colors, and each element being further configured to reflect a portion of the incident light beam, the reflected portion being an unfiltered portion, so that the polarization of the unfiltered portion is not changed when leaving the display panel,
wherein each display panel is configured to reflect and modulate the filtered portion from the corresponding micro dichroic filter array within the display panel so that the polarization of at least some of the filtered portions are changed when leaving the display panel.

27. The system of claim 26, wherein the polarizing beam splitter assembly comprises a plurality of polarizing beam splitter cubes.

28. The system of claim 27, further comprising one or more half wave plates positioned between the polarizing beam splitter cubes.

29. The system of claim 26, wherein the polarizing beam splitter assembly comprises a plurality of right angle prisms.

30. The system of claim 29, wherein the polarizing beam splitter coatings are positioned on right angle surfaces of the right angle prisms.

31. The system of claim 26, further comprising a light recycle system for resubmitting the unfiltered portions of the first and second light beams to the first and second display panels.

32. A method comprising:
directing a first light beam to reflect from a first color liquid crystal on silicon (LCoS) display panel and a second light beam to reflect from a second color LCoS display panel, the first and second color LCoS display panels each comprising a micro dichroic filter array, each micro dichroic filter array comprising multiple elements each configured to transmit a corresponding portion of an incident light beam, the transmitted portion being a filtered portion where the filtered portion from different elements are different colors, and each filter being further configured to reflect a portion of the incident light beam, the reflected portion being an unfiltered portion, so that the polarization of the unfiltered portion is not changed when leaving the display panel,
wherein each display panel is configured to reflect and modulate the filtered portion from the corresponding micro dichroic filter array within the display panel so that the polarization of at least some of the filtered portions are changed when leaving the display panel; and
combining the filtered portions of the first light beam reflected by the first display panel with the filtered portions of the second light beam reflected by the second display panel to form an image beam,
wherein the combined filtered portions of the first and second light beams have mutually orthogonal polarization states.

33. The method of claim 32, wherein the filtered portions of the first and second light beams are modulated with the first and second display panels so that the reflected filtered first and second light beam portions correspond to different view angles of an image.

34. The method of claim 33, wherein each element of the micro dichroic filter arrays are selected so that the filtered portions reflected by the first and second display panels are red, green, or blue.

35. The method of claim 32, wherein the filtered portions of the first and second light beams are modulated with the first and second display panels so that the reflected filtered first and second light beam portions correspond to the same view angle of an image.

36. The method of claim 35, wherein elements of the micro dichroic filter array of the first display panel are selected so that the filtered portions from the first display panel are red, green or blue, and elements of the micro dichroic filter array of the second display panel are selected so that the filtered portions from the second display panel are cyan, magenta, or yellow.

37. The method of claim 32, further comprising splitting an input light beam to form the first and second light beams.

38. The method of claim 37, wherein the first and second light beams have mutually orthogonal polarization states.

39. The method of claim 32, further comprising amplifying the image beam.

40. The method of claim 32, wherein the unfiltered portions of the first and second light beams are provided to a light recycle system for resubmitting the unfiltered portions to the first and second display panels.

* * * * *